Patented Jan. 9, 1940

2,186,524

UNITED STATES PATENT OFFICE 2,186,524

PROCESS OF INCREASING THE CONCENTRATION OF OLEFINS IN A MIXTURE CONTAINING OLEFINS AND PARAFFINS

Frederick E. Frey, Maryan P. Matuszak, and Robert D. Snow, Bartlesville, Okla., assignors to Phillips Petroleum Company, Bartlesville, Okla., a corporation of Delaware No Drawing. Application July 26, 1935, Serial No. 33,384

12 Claims. (Cl. 196—13)

This invention relates to the concentration of olefins in a fluid mixture containing olefins and paraffins, and particularly to the concentration of olefins in a fluid mixture containing olefins and paraffins of such closely adjacent boiling points that practical concentration by fractional distillation of the mixture is very difficult if not impossible.

Large quantities of fluid mixtures containing olefins and paraffins are obtained in modern industrial cracking of petroleum products. By fractional distillation of such mixtures it is possible to obtain fractions each of which consists substantially of hydrocarbons having the same number of carbon atoms to the molecule. For example, the compositions of typical four-carbon and five-carbon fractions of the products from a certain liquid-phase cracking process are as follows:

| Four-carbon fraction | Per cent | Five-carbon fraction | Per cent |
|---|---|---|---|
| Isobutane | 11.4 | Tertiary pentenes | 16 |
| n-Butane | 49.0 | 1-pentene | 11 |
| Isobutene | 10.1 | 2-pentenes | 20 |
| 1-butene | 10.4 | Pentanes (n- and iso) | 53 |
| 2-butenes | 18.2 | | |
| Butadiene | 0.9 | | |
| Total | 100.0 | Total | 100 |

It is frequently desirable, for purposes of practical utilization, to effect a more or less complete separation of the hydrocarbons in such fractions into two parts, one consisting substantially of the olefins and the other of the paraffins. For example, chemical reactions involving the hydrocarbons of one class sometimes are unfavorably influenced by the presence of the hydrocarbons of the other class. Thus, in the manufacture of resins from sulfur dioxide and olefins, the presence of paraffins can retard the reaction, by a diluent action, to the extent of making it commercially uneconomical; it is far better to concentrate the olefins beforehand. Similarly, in the catalytic dehydrogenation of paraffins to form olefins, wherein an equilibrium is reached between the dehydrogenation reaction and the opposing hydrogenation reaction, the olefins should be separated from the paraffins before the paraffins are passed over the dehydrogenation catalyst; likewise, the olefins should be removed after each cycle before the unreacted paraffins are recycled. Other instances of the desirability or necessity of separating olefins from paraffins, for the best utilization of one part or the other, are familiar to workers in the field of hydrocarbon reactions.

It is well-known that simple fractional distillation of a mixture of hydrocarbons having little difference in vapor pressure does not succeed in their practical separation. This is true, for example, of the four-carbon and five-carbon olefins and paraffins, whose boiling points are, in the order of increasing temperatures, at one atmosphere pressure:

| Four-carbon hydrocarbons | °C. | Five-carbon hydrocarbons | °C. |
|---|---|---|---|
| Isobutane | −12.2 | Isopropylethylene | 21.2 |
| Isobutene | −7.5 | Isopentane | 27.9 |
| 1-butene | −6.5 | 1-pentene | 30.2 |
| n-Butane | −0.6 | Methyl ethyl ethylene | 32.0 |
| 2-butene | +0.9 | 2-pentene | 35.8 |
| 2-butene (isomer) | +3.6 | n-Pentane | 36.2 |
| | | Trimethylethylene | 37.7 |

In general, the members of each group have boiling points within such a narrow temperature range that practical separation by simple fractional distillation is very difficult or impossible. Moreover, the orders of the boiling points are such that simple fractional distillation would necessitate the formation of four fractions from the four-carbon group and four to six fractions from the five-carbon group in order to effect separation of the olefins from the paraffins. This would involve undesirable expenditure of time, effort and equipment; for, as has been implied above, it is frequently desirable or sufficient to separate a given hydrocarbon mixture merely into an olefin part and a paraffin part.

Our invention is a process for the separation of olefins from paraffins by fractionally distilling mixtures containing both types of hydrocarbons in the presence of a compound which forms minimum-boiling azeotropic mixtures with the individual hydrocarbons, said azeotropic mixtures preferably containing not less than about 10 mol per cent nor more than about 90 mol per cent of the said compound. We prefer to apply our process to hydrocarbon mixtures having a relatively narrow boiling range, and best results are obtainable from mixtures of hydrocarbons containing less than six carbon atoms per molecule, for which suitable compounds are the polar oxygen-containing compounds of the group consisting of sulfur dioxide, ethylene oxide, and methyl formate.

Although each of these three compounds can be used for the concentration of either four-carbon or five-carbon olefins, we prefer to use sulfur dioxide for the concentration of four-carbon olefins and prefer the use of methyl formate for the concentration of five-carbon olefins.

Since the basic principles of our process are the same for the various compounds we have found to be suitable, we shall confine the detailed description of our invention, for purposes of illustration and without limiting our invention thereby, to the concentration of four-carbon olefins with the aid of sulfur dioxide.

We have found that sulfur dioxide forms minimum-boiling azeotropic mixtures with, for example, each of the four-carbon hydrocarbons. The boiling points of these azeotropic mixtures at atmospheric pressure are approximately as follows:

|  | °C. |
|---|---|
| Azeotrope of isobutane | −27 |
| Azeotrope of n-butane | −22 |
| Azeotrope of 1-butene | −19 |
| Azeotrope of isobutene | −17.5 |
| Azeotrope of 2-butene | −16 |

The order of the boiling points for these azeotropic mixtures is quite different from that of the boiling points of the hydrocarbons themselves; for the azeotropes of the paraffins, isobutane and n-butane, boil before the azeotropes of any of the olefins.

If to a mixture of four-carbon hydrocarbons sulfur dioxide is added in an amount just sufficient to form the azeotropes of the two butanes, and if the resulting mixture is fractionally distilled, the butenes and butanes can be separated in a novel but simple and efficient manner. For the boiling points involved are:

|  | °C. |
|---|---|
| Azeotrope of isobutane | −27 |
| Azeotrope of n-butane | −22 |
| Isobutene | −7.5 |
| 1-butene | −6.5 |
| 2-butene | +0.9 |
| 2-butene (isomer) | +3.6 | and there is a difference of about 14.5° C. between the boiling point of the highest boiling paraffin azeotrope and the boiling point of the lowest boiling olefin. By fractionally distilling off the azeotropes of the two paraffins, the olefins are left behind as a residue in the desired concentrated condition. This illustrates one way of advantageously using our invention.

It is not, however, necessary that the sulfur dioxide be limited in amount to that required for the azeotropes of the paraffins. We have found that liquid sulfur dioxide has a solvent action for fluid hydrocarbons and that this solvent action is much stronger for olefins than for paraffins. As a consequence of this strong preferential solvent action for olefins, the liquid phase during a fractional distillation of a mixture of sulfur dioxide and hydrocarbons tends to retain the olefins in preference to the paraffins. This preferential solvent action does not exert an appreciable effect unless the liquid phase has a concentration greater than a certain lower limit, which limit we have found to be about 8 or 10 mol per cent of sulfur dioxide for the case of four-carbon hydrocarbons. And this preferential solvent action for olefins is naturally exerted more strongly the greater the concentration of sulfur dioxide. Thus, whereas a liquid consisting of four-carbon hydrocarbons and less than about 10 mol per cent of sulfur dioxide does not influence greatly the hydrocarbon composition of the vapor in contact with it, one containing 25 mol per cent of sulfur dioxide has a definite and appreciable tendency to reduce the butene content of the vapor, and one containing 40 mol per cent of sulfur dioxide has an effect approximately twice as great as that containing 25 mol per cent. During fractional distillation of a mixture, for example, of four-carbon hydrocarbons containing an amount of sulfur dioxide equal to that required for the azeotropes of the paraffins, the fractionation causes an increase in the concentration of sulfur dioxide in the vapor and liquid phases present in the fractionation tower as the vapors progressively proceed up the tower until the concentration corresponding to the azeotropic mixture going overhead is reached. This concentrating of sulfur dioxide requires the utilization of a portion of the fractionation tower. Conversely, if the mixture of hydrocarbons contains more sulfur dioxide than that required to form only the azeotropes of the paraffins, a smaller fractionation tower is required by virtue of elimination of the necessity for concentrating the sulfur dioxide. Hence, using an amount of sulfur dioxide in excess of that required to form the azeotropes of the paraffins has the advantage that a smaller and therefore less expensive fractionation tower is adequate for the process of separating the olefins from the paraffins. Such a process, then, of fractionally distilling a mixture of hydrocarbons in the presence of more than enough sulfur dioxide to form the azeotropes of the paraffins is another way of advantageously using our invention.

We have found that a large excess of sulfur dioxide, even in excess of that required to form azeotropes of all the hydrocarbons that may be present, has no deleterious effect upon the separation of paraffins from olefins by our process.

We have also found that the process is efficient over a wide range of temperature and pressure. It is, however, somewhat more efficient—in the sense that a fractionation tower of fewer plates is required—the lower the temperature if operated below a certain threshold temperature. Above this threshold temperature, the efficiency is virtually independent of the temperature. Because of these facts, close control of the temperature of the medium used to cool and condense the reflux and the over-head vapors is not necessary. This constitutes an important advantage in regions where the temperature of cooling water fluctuates greatly with the seasons.

Without limiting ourselves thereto, we can state that our process works satisfactorily at temperatures varying from below −40° C. to above 100° C. and at pressures varying from less than half an atmosphere, absolute, to more than 29 atmospheres, absolute.

As a specific example of a distillation, we can state that a sample of 770 cubic centimeters of gaseous hydrocarbons containing 19.7 per cent butenes and 80.3 per cent n-butane, when distilled in presence of 1210 cubic centimeters of gaseous sulfur dioxide in a vacuum-jacketed but unsilvered glass gas-analytical column, at a still head temperature of 0° C., gave an initial fraction containing 82.7 per cent of all the butane at a sulfur dioxide-free concentration of 99.0 per cent, an intermediate fraction containing 16.7 per cent of all the butane at a concentration of 78.4 per cent, and a final or residual fraction containing 77.3 per cent of all the butenes at a concentration of 97.4 per cent. These figures are given for purposes of illustration only, for it is recognized that they were obtained under the unfavorable circumstances of a small sample, a low original butene content, and a comparatively inefficient fractionation apparatus. In spite of these unfavorable circumstances, however, it will be noted that our process increased the major portion of the butene content from an initial concentration of less than 20 per cent to one of more than 97 per cent.

The sulfur dioxide in the fractions can be separated or increased in concentration by any convenient means and returned to the process. For certain purposes, however, the olefin-rich fraction need not be freed from the sulfur dioxide, as for example in the manufacture of resinous olefin-sulfur dioxide products. This is an important advantage attendant upon the use of sulfur dioxide instead of other compounds. Other advantages that sulfur dioxide possesses are its high specific gravity, which aids the reflux downflow of the liquid phase in the fractional distillation, its comparatively great selective solvent action for olefins, its low cost, its general availability, its stability, and its ease of handling.

A modification of the above described process consists of operating it at a relatively low still-head temperature and then fractionally redistilling one or both of the resulting paraffin-rich and olefin-rich fractions at a relatively high still-head temperature. We have found that the proportion of sulfur dioxide in the azeotropic mixtures increases with the temperature of distillation. For example, the azeotropic mixture of n-butane contains about 63 mol per cent of sulfur dioxide if distilled at 0° C. but contains about 73 mol per cent if distilled at 100° C. Hence, if 100 parts of the azeotrope of n-butane produced at a distillation temperature of 0° C. be taken and redistilled at 100° C. there will result a distillate portion consisting of .63 parts of sulfur dioxide and 23.3 parts of butane and a residue portion consisting of 13.7 parts of substantially pure butane. The 86.3 parts of distillate, which now contains 73 mol per cent sulfur dioxide, can be returned as reflux to the process of separating olefins and paraffins; or it can be redistilled again, this time at 0° C., whereupon there will result a distillate portion consisting of 39.7 parts of sulfur dioxide and 23.3 parts of butane and a residue portion consisting of 23.3 parts of substantially pure sulfur dioxide, which can be returned to the main process for use again in separating the olefins from the paraffins. This cycle of fractional redistillations alternately at 0° C. and at 100° C. can be repeated in either a batch or a continuous manner obvious to those skilled in the art, until the original azeotropic mixture is completely separated into substantially pure sulfur dioxide and substantially pure butane. In like manner, the olefin-rich fraction can be separated into pure sulfur dioxide and butenes.

Another modification of our process consists of fractionally redistilling the distillate from the first fractional distillation at a second and lower still head temperature, whereby a distillate which is less rich in sulfur dioxide and a residue which is predominantly sulfur dioxide are produced, and using the residue from the fractional distillation at the second temperature as part of the reflux in the first fractional distillation.

Another modification of our process consists of fractionally redistilling the olefin-rich residue from the first fractional distillation of paraffin-olefin mixtures with excess sulfur dioxide at a second and higher still head temperature, whereby an olefin-rich residue practically free from sulfur dioxide and a distillate rich in sulfur dioxide are produced, and using the said distillate from the redistillation operation as part of the reflux in the first fractional distillation.

A further modification of our process consists of fractionally distilling a mixture of olefin and paraffin hydrocarbons and liquid sulfur dioxide in excess of that required to form the azeotropes of the paraffins present at one still head temperature, fractionally redistilling the distillate at a second and higher still head temperature, whereby a distillate rich in sulfur dioxide and a residue of substantially pure paraffins are produced, and using the distillate from the fractional distillation at the second temperature as part of the reflux in the fractional distillation at the first temperature; and fractionally redistilling the residue from the fractional distillation at the first temperature at a third still head temperature which is also higher than the first still head temperature, whereby a distillate rich in sulfur dioxide and a residue predominating in olefins are obtained, and using the distillate from the fractional distillation at the third temperature as part of the reflux in the fractional distillation at the first temperature.

Another modification of our process consists of cooling the paraffin-rich distillate below a certain temperature, whereupon it separates into two layers, the lower of which consists chiefly of sulfur dioxide and the upper of which consists chiefly of the paraffins. For n-butane this temperature is not above about $-5°$ C. but it is higher for paraffins of higher molecular weight. It is decreased by the presence of butenes. At $-20°$ C., the lower layer contains about 93 mol per cent sulfur dioxide and about 7 mol per cent of n-butane and the upper layer only about 34 mol per cent sulfur dioxide and about 66 mol per cent of n-butane. The two layers can be separated and the lower one can be returned as reflux in the process of separating olefins from paraffins or with the hydrocarbon feed to the column, and the upper layer can be fractionally distilled as described in a previous paragraph or otherwise freed from its sulfur dioxide content.

It will be obvious to those skilled in the art that various combinations and variations of the principles we have described can be successfully applied to the purpose of our invention, especially with respect to operating conditions of temperature and pressure; hence it is understood that our invention is not limited by the illustrative figures we have used but is as extensive in scope and equivalents as the prior art allows. For instance, the sulfur dioxide need not be added to the hydrocarbon mixture, which is to be separated, prior to the fractional distillation but can be added during the distillation itself at such point in the fractionation tower as is most expedient for any selected operating conditions, for example, at a point above that at which the hydrocarbons are fed into the tower. By the term fractionally distilling as used in the appended claims is meant a distillation with countercurrent reflux conducted in a bubble plate column or its equivalent.

What we claim is:

1. A process of separating a mixture of hydrocarbons having substantially the same number of carbon atoms per molecule and including at least one paraffin hydrocarbon and at least one olefin hydrocarbon into a paraffin part and an olefin part comprising adding to the said mixture a compound capable of forming a minimum-boiling azeotropic mixture with each of said hydrocarbons, said azeotropic mixture containing said added compound to an extent within the range of about 10–90 mol per cent, fractionally distilling off at one still-head temperature substantially all of the paraffin hydrocarbons as an initial predominantly olefin-free distillate fraction containing said paraffin hydrocarbons mixed with said added compound, fractionally redistilling the said distillate fraction at a second and higher still-head temperature, and using the distillate from the fractional distillation at the second temperature as part of the reflux in the fractional distillation at the first temperature.

2. A process of separating a mixture of hydrocarbons having substantially the same number of carbon atoms per molecule and including at least one paraffin hydrocarbon and at least one olefin hydrocarbon into a paraffin part and an olefin part comprising adding to the said mixture a compound capable of forming a minimum-boiling azeotropic mixture with each of said hydrocarbons, said azeotropic mixture containing said added compound to an extent within the range of about 10–90 mol per cent, fractionally distilling off at one still-head temperature substantially all of the paraffin hydrocarbons as an initial predominantly olefin-free distillate fraction containing said paraffin hydrocarbons mixed with said added compound, fractionally redistilling said distillate fraction at a second and lower still-head temperature, and using the residue from the fractional distillation at the second temperature as part of the reflux in the fractional distillation at the first temperature.

3. A process of separating a mixture of hydrocarbons having substantially the same number of carbon atoms per molecule and including at least one paraffin hydrocarbon and at least one olefin hydrocarbon into a paraffin part and an olefin part comprising adding to the said mixture a compound capable of forming a minimum-boiling azeotropic mixture with each of said hydrocarbons in a proportion greater than that sufficient to form minimum-boiling azeotropic mixtures with substantially the total content of paraffin hydrocarbons, said azeotropic mixtures containing said added compound to an extent within the range of about 10–90 mol per cent, distilling off at one still-head temperature substantially all of the paraffin hydrocarbons as an initial predominantly olefin-free distillate fraction containing said paraffin hydrocarbons mixed with a portion of said added compound, obtaining a predominantly paraffin-free residue containing substantially all of said olefin hydrocarbons mixed with another portion of said added compound, fractionally redistilling said residue at a second and higher still-head temperature, and using the distillate from the fractional distillation at the second temperature as part of the reflux in the fractional distillation at the first temperaure.

4. A process of separating a mixture of hydrocarbons having substantially the same number of carbon atoms per molecule and including at least one paraffin hydrocarbon and at least one olefin hydrocarbon into a paraffin part and an olefin part comprising adding to the said mixture a compound capable of forming a minimum-boiling azeotropic mixture with each of said hydrocarbons, said azeotropic mixture containing said added compound to an extent within the range of about 10–90 mol per cent, fractionally distilling off at one still-head temperature substantially all of the paraffin hydrocarbons as an initial predominantly olefin-free distillate fraction containing said paraffin hydrocarbons mixed with said added compound, fractionally redistilling the said distillate fraction at a second and higher still-head temperature, and using the distillate from the fractional distillation at the second temperature as part of the reflux in the fractional distillation at the first temperature, and fractionally redistilling the residue from the fractional distillation at the first temperature at a third temperature which is also higher than the first temperature and using the distillate from the fractional distillation at the third temperature as part of the reflux in the fractional distillation at the first temperature.

5. A process of separating a mixture of hydrocarbons having substantially the same number of carbon atoms per molecule, said number being less than six, and including at least one paraffin hydrocarbon and at least one olefin hydrocarbon into a paraffin part and an olefin part comprising adding to the said mixture a polar oxygen-containing compound capable of forming a minimum-boiling azetropic mixture with each of said hydrocarbons, said azeotropic mixture containing said added compound to an extent within the range of about 10–90 mol per cent, and fractionally distilling off substantially all of the paraffin hydrocarbons as an initial predominantly olefin-free distillate fraction containing said paraffin hydrocarbons mixed with said added compound, cooling the said distillate fraction to below the temperature at which it separates into two liquid layers, separating the lower and heavier layer which is rich in the polar oxygen-containing compound, returning said lower layer as reflux to the fractional distillation, fractionally redistilling the upper and lighter layer separately into a minor part having substantially the composition of the said distillate fraction and a major part consisting substantially of pure paraffins and removing said major part from the process, obtaining the olefin hydrocarbons in substantially paraffin-free condition as a residue from the said fractional distillation, and liberating said residue from any undesired content of the polar oxygen-containing compound.

6. A process of separating a mixture of hydrocarbons having substantially the same number of carbon atoms per molecule, said number being less than six, and including at least one paraffin hydrocarbon and at least one olefin hydrocarbon, into a paraffin part and an olefin part comprising adding to the said mixture a polar oxygen-containing compound capable of forming a minimum-boiling azeotropic mixture with each of said hydrocarbons in a quantity at least sufficient to form minimum-boiling azeotropic mixtures with all the paraffin hydrocarbons, and subjecting said mixture to fractional distillation with reflux to fractionally distill off substantially all of the paraffin hydrocarbons as an initial predominantly olefin-free minimum-boiling azeotropic mixture of the paraffins and the added compound.

7. The process as in claim 6 in which the polar oxygen-containing compound is sulfur dioxide.

8. The process as in claim 6 in which the polar oxygen-containing compound is ethylene oxide.

9. The process as in claim 6 in which the polar oxygen-containing compound is methyl formate.

10. A process for separating a mixture of paraffin and olefin hydrocarbons having four carbon atoms per molecule into a paraffin part and an olefin part which comprises adding to said mixture sulfur dioxide in a quantity at least sufficient to form minimum-boiling azeotropic mixtures with all the paraffin hydrocarbons in the mixture, and subjecting the mixture to fractional distillation with reflux to fractionally distill off substantially all of the paraffin hydrocarbons as an initial, predominantly olefin-free minimum-boiling azeotropic mixture of the paraffins and sulfur dioxide.

11. A process for separating a mixture of paraffin and olefin hydrocarbons having five carbon atoms per molecule into a paraffin part and an olefin part which comprises adding to said mixture methyl formate in a quantity at least sufficient to form minimum-boiling azeotropic mixtures with all the paraffin hydrocarbons in the mixture, and subjecting the mixture to fractional distillation with reflux to fractionally distill off substantially all of the paraffin hydrocarbons as an initial, predominantly olefin-free minimum-boiling azeotropic mixture of the paraffins and methyl formate.

12. The process as in claim 6 in which the distillate mixture of paraffins and added compound is cooled sufficiently to effect a separation into a paraffin layer and an added compound layer, and returning the added compound layer to the fresh feed undergoing fractional distillation.

FREDERICK E. FREY.
    MARYAN P. MATUSZAK.
    ROBERT D. SNOW.